(12) United States Patent
Sodhi

(10) Patent No.: US 7,308,688 B2
(45) Date of Patent: Dec. 11, 2007

(54) SYSTEM AND METHOD FOR SHARED MEMORY BASED IPC QUEUE TEMPLATE HAVING EVENT BASED NOTIFICATION

(75) Inventor: Ajit S. Sodhi, Irvine, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 573 days.

(21) Appl. No.: 10/921,530

(22) Filed: Aug. 19, 2004

(65) Prior Publication Data

US 2005/0044551 A1    Feb. 24, 2005

Related U.S. Application Data

(60) Provisional application No. 60/496,206, filed on Aug. 19, 2003.

(51) Int. Cl.
*H04L 12/24* (2006.01)
*G06F 13/14* (2006.01)
*H04L 12/56* (2006.01)

(52) U.S. Cl. .................. 719/312; 370/412; 370/413

(58) Field of Classification Search ................ 719/312; 370/412–429
See application file for complete search history.

(56) References Cited

U.S. PATENT DOCUMENTS

| 5,115,499 A | * | 5/1992 | Stiffler et al. ................ 711/148 |
| 5,133,053 A | | 7/1992 | Johnson et al. |
| 5,617,570 A | * | 4/1997 | Russell et al. ............... 719/312 |
| 5,916,307 A | * | 6/1999 | Piskiel et al. ................ 719/314 |
| 5,991,820 A | | 11/1999 | Dean |
| 6,829,769 B2 | * | 12/2004 | Cranston et al. ............. 719/312 |
| 2002/0144006 A1 | | 10/2002 | Cranston et al. |
| 2002/0146031 A1 | * | 10/2002 | Nichols ....................... 370/445 |

(Continued)

OTHER PUBLICATIONS

Gray, Dina; Haviland, Keith; and Salama, Ben. UNIX System Programming, Second Edition. Pearson Education, Limited, 1998. Chapter 8, pp. 179-217.*

(Continued)

*Primary Examiner*—William Thomson
*Assistant Examiner*—Richard Pantoliano, Jr.
(74) *Attorney, Agent, or Firm*—Tucker Ellis & West LLP

(57) ABSTRACT

This invention is directed to a system and method for using a template that allows a user to define a specific message format for use in a shared memory queue in the inter-process communication environment. A shared segment of the size needed to hold the supplied number of elements and a queue header are created. The system then unmaps the queue from the user's address space. The queue contents are reset to initialize the state. The supplied element in the queue is Pushed. The element for the queue First-In/First-Out (FIFO) is Popped. An element from the queue may be returned, without affecting queue status. The element content in the queue is then updated. The queue is subsequently locked for exclusive access. The lock may be released, enabling changes to the queue. The system also provides the element count in the queue and the logical name of the inter-process communication queue. The shared memory based header maintained by each inter-process communication queue allows all the clients of the queue to access queue information from a single source.

24 Claims, 2 Drawing Sheets

U.S. PATENT DOCUMENTS

2002/0172211 A1* 11/2002 Nichols ................. 370/412

OTHER PUBLICATIONS

Website: 6.3 Variable and Constant Template Parameters; http://people.cs.vt.edu/-kafura/cs2704/templates3.html; dated Apr. 22, 2003.

Website: Queue and Stack Classes; http:/www.cs.qub.ac.uk/-J.Campbell/myweb/oop/oophtml/node18.html; dated Apr. 22, 2003.

Website: Queue; http://www.cs.bsu.edu/homepages/peb/cplusplus/queue.htm; dated Apr. 22, 2003.

Website: Applied Reading, Taming Shared Memory; http://home.earthlink.net/-joshwalker1/writing/SharedMemory.html; dated Apr. 25, 2003.

Website: A Simple Wrapper for Sharing Data Structures Between Processes; http://www.codeproject.com/threads/csharedstruct.asp, no date found.

Website: Hermes Base; http://www.npssoft.com/hermes_base.html; dated Apr. 25, 2003.

Chapter 5 Interprocess Communication Mechanisms; pp. 1-10, no date found.

DataSend Interprocess Communication Control for Visual Basic; pp. 1-4; DataSend Interprocess Communication ActiveX control component for Visual Basic, no date found.

Dynamic Data Exchange; pp. 1-2; DDE—a whatis definition—see also: Dynamic Data Exchange, no date found.

Website: Communicating Among Plug-Ins; http://www.lightwave-outpost.com/-bhood/LScript/Appendix_C.html; dated Apr. 22, 2003.

Brian N. Bershad; User-Level Interprocess Communication for Shared Memory Multiprocessors; ACM Transactions on Computer Systems, vol. 9, No. 2, May 1991, p. 175-198.

Steven S. Lumetta, et al.; Multi-Protocol Active Messages on a Cluster of SMP's; Aug. 25, 1997; pp. 1-22.

M. Frans Kaashoek, et al.; Application Performance and Flexibility on Exokernel Systems; M.I.T. Laboratory for Computer Science; pp. 52-65, no date found.

* cited by examiner

SYSTEM AND METHOD FOR SHARED MEMORY BASED IPC QUEUE TEMPLATE HAVING EVENT BASED NOTIFICATION

CROSS-REFERENCE TO RELATED APPLICATIONS

The present application claims the benefit of U.S. Provisional Application 60/496,206 filed Aug. 19, 2003.

BACKGROUND OF THE INVENTION

This invention is directed to a system and method for facilitating platform independent fast communication. More particularly, the subject invention is directed to a shared memory based Inter-Process Communication ("IPC") queue template to facilitate the fastest communication possible on any platform.

Shared memory allows one or more processes to communicate via memory that appears in all of their virtual address spaces. The pages of the virtual memory are referenced by page table entries in each of the sharing processes' page tables. It does not have to be at the same address in all of the processes' virtual memory. Access to shared memory areas is controlled via keys and access rights checking. Once the memory is being shared, there are no checks on how the processes are using it. They must rely on other mechanisms. When two processes attach the same shared memory segment, they are telling the operating system to relax the normal restrictions by mapping a portion of their address space onto the same memory. IPC message queues are transient memory areas, typically provided by the underlying operating system, used for communication between clients and servers.

A semaphore is a flag used to check whether a resource is currently being used by another thread or process. In its simplest form, a semaphore is a location in memory whose value can be tested and set by more than one process. The test and set operation is, so far as each process is concerned, uninterruptible or autonomous; once started nothing can stop it. The result of the test and set operation is the addition of the current value of the semaphore and the set value, which can be positive or negative. Depending on the result of the test and set operation one process may have to sleep until the semaphore's value is changed by another process. For example, if a process wants to use the printer, it first needs to make sure that the printer is available by checking to see if the semaphore has been set. If the semaphore is set, the process must wait until the process that currently has the printer is finished. However, if the printer were free, the process would set the semaphore and start using the printer, blocking access to all other processes until it finished.

Semaphores are a classical technique for protecting critical sections of code from being simultaneously executed by more than one thread. A semaphore is a generalization of a monitor. A monitor allows only one thread to lock an object at once. A semaphore allows N processes. The process of grabbing a semaphore for semi-exclusive use is called downing the semaphore because they are implemented with a countdown integer that decrements for each lock and increments for each unlock. If a semaphore is fully occupied, new threads wanting to use it will wait until some thread releases its lock by incrementing the semaphore. For a semaphore to work, the check for full and the decrement must be done all in one atomic uninterruptible instruction. The Java Virtual Machine ("JVM") monitor instructions provide the needed hardware support to simulate semaphores.

Thus, there is a need for a system and method of providing fast communications between processes using inter-process communications queue templates in a shared memory manager.

SUMMARY OF THE INVENTION

The present invention is directed to a system and method for fast, platform independent communication between processes.

The system of the present invention uses a shared memory based inter-process communication queue. The data in the queue is fully protected, i.e., the queue provides auto locking of each queue element, when more than one process tries to modify its contents. This operation gives the client of the queue complete freedom from managing the shared resources across process and threads. The system also enables easy role reversal between a transmitter and a receiver. Reversing the roles of the transmitter and recipient is accomplished without creating any additional resources. The system further uses event based notification schemes. For communications between processes, the templates will wait for the Push/Pull Element function, thereby allowing for instant delivery of a change in status of the queue. That is, the notification methods allow for the queue to inform a client to wait until such time as the desired process becomes available. Once available, the resources of that desired process are enabled for the waiting client.

The system also includes the ability of automatic recovery from system crashes. The queue always has information regarding the clients it is serving. In the event that any of the processes crash or affect the state of the queue, an auto detection capability prevents the processes to lock up the system. The detection is accomplished by means for checking the number of attached processes to the shared segment.

The system begins by creating a shared segment of the a size needed to hold the supplied number of elements and a queue header. The system then unmaps the queue from the user's address space. The queue contents are reset to initialize the state. The supplied element in the queue is Pushed. The element for the queue First-In/First-Out (FIFO) is Popped. An element from the queue is returned without affecting queue status. The element content in the queue is then updated. The queue is subsequently locked for exclusive access. The lock is suitably released, enabling changes to the queue. Furthermore, the system provides the element count in the queue and the logical name of the inter-process communication queue. The shared memory based header maintained by each inter-process communication queue allows all the clients of the queue to access queue information from a single source.

In accordance with the present invention, there is provided a system for peer-based inter-process communication. The system includes a plurality of peer processes. Each process of the system incorporates a bus system that enables the selective communication of data between two of the peer processes. The system also includes a shared memory that selectively stores shared data and is accessible by any of the processes. Each process includes means adapted for notifying at least one other process when a modification is made to the content of the shared memory. In addition, each process is equipped with a locking mechanism to selectively lock the shared memory from access by other processes.

In a preferred embodiment, each process of the system further comprises a template generator, that sets forth a message template specifying a format acceptable to that process. The process also includes means adapted for communicating the message template to at least one other process.

Further, in accordance with the present invention, there is provided a method for peer-based inter-process communication performed in a system comprising a plurality of peer processes. The method begins by selectively communicating data between a first and a second process. Next, shared data is selectively stored in a shared memory accessible by any of the processes. One or more of the processes are subsequently notified when a modification is made to content of the shared memory. The shared memory is then selectively locked from access by one of the processes.

In a preferred embodiment, the method further includes the step of generating a message template specifying a format acceptable to a process. The method also includes the step of communicating the message template to at least one other of the plurality of processes.

Still other advantages, aspects and features of the present invention will become readily apparent to those skilled in the art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

The subject invention is described with reference to certain parts, and arrangements to parts, which are evidenced in conjunction with the associated drawings, which form a part hereof and not, for the purposes of limiting the same in which.

DETAILED DESCRIPTION OF INVENTION

The present invention is directed to a system and method for providing a shared memory manager based on an Inter-Process Communication (IPC) queue template to facilitate the fast communication between processes.

In a system having a user, a transmitter and a recipient, the Shared Memory Manager based upon IPC Queue Templates facilitate the fast communication between processes. By having the queue in template form, any message format may be used. The user provides a message format that is known to both transmitter and the recipient at the time the user creates the message from the template. The use of templates provides instant notification and instant delivery of queue status changes. Using the templates provided hereunder, the shared memory manager performs the key operations in a faster, more efficient manner than previously capable.

An IPC Queue Template as contemplated by the present invention, is capable of performing several key operations.

Figure 1:
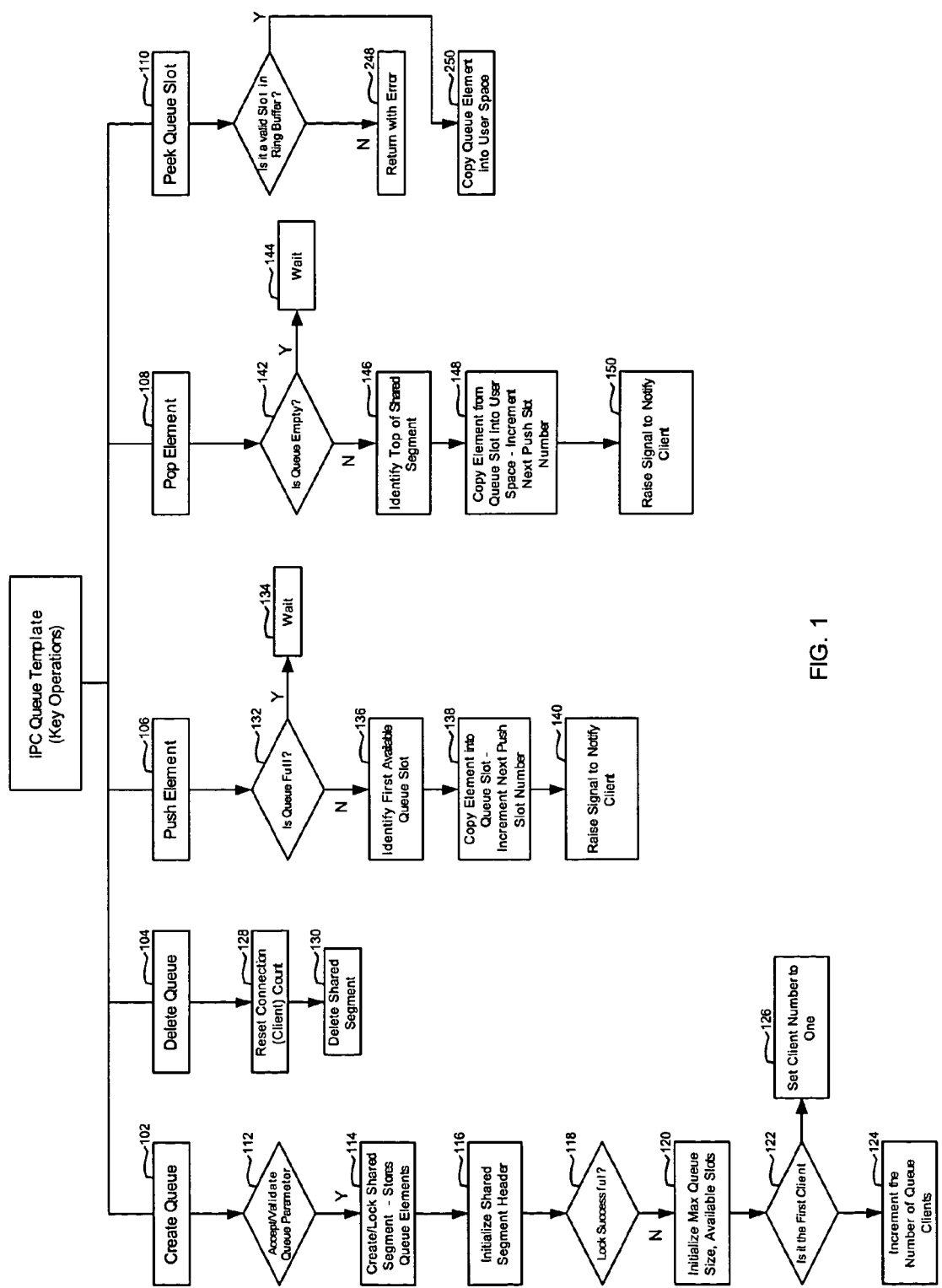
FIG. 1 is a flow chart illustrating the inter-process communications templates contemplated by the present invention.

Turning to FIG. 1 there is shown a hierarchical flow chart depicting the key operations of the IPC Queue Template utilized in the subject invention. These key operations are (1) Create Queue 102, (2) Delete Queue 104, (3) Push Element 106, (4) Pop Element 108, and (5) Peek Queue Slot 110. The key operations are represented as the top level hierarchy, with explanatory flows depending therefrom.

To Create a Queue 102, or CQ Template 102, the template must be configured to first validate a parameter received from the user at step 112. In the absence of a valid parameter at step 112, the Create Queue 102 template will not function. Upon the acceptance and/or validation of the parameter at step 112, the Create Queue Template 102 will Create/Lock Shared Segment to store Queue Elements at 114. The Segment size is determined by the Queue Element Size and the Max Queue Elements. The Queue Element is then linked to the Shared Segment Queue Name for queue discovery. The CQ Template 102 then initializes the Shared Segment Header at step 116. The Shared Segment Header contains the values for the Next Push Slot, Next Pop Slot, Queue Size, Queue Name, Num of Elements, and similar items. This shared segment will act like a ring buffer for Queue Element Management.

Following initialization of the Shared Segment Header, the CQ Template 102 will then need to determine if the Create/Lock of step 114 was successful at step 118. A successful lock at 118 enables the CQ Template 102 to progress to step 120 where the Max Queue Size and the Available Slots are initialized. The CQ Template 102 then interrogates the originator of the Queue Parameter of 112 and at 122 determines whether or not the originator is the first client. If the originator is the first client, the CQ Template 102 proceeds to 126 where the Client Num is set to one. In the event that the originator is not the first client, the CQ Template 102 proceeds to 124 where the Num of Queue clients is incremented.

Returning the top level of FIG. 1, there is shown a brief flow chart depicting the functions of key operation Delete Queue Template 104. This simplistic operation performed by the IPC Template involves two steps. The first step at 128 is the Reset Connection or client count. Once reset, the Delete Queue Template 104 is then able to delete the Shared Segment linked with the Queue Name at 130.

Turning next to the Push Element 106 operation of a corresponding IPC Queue Template, the Push Element 106 begins by determining the status of the queue, that is, whether or not the Queue is full at 132. In the event that the queue is full, the Push Element will wait at 134 until an Element is Popped. Upon the determination in step 132 that the Queue is not full, the Push Element 106 template proceeds to identify the first available Queue Slot at 136. The identification of the first available Queue Slot is accomplished by the Shared Segment based ring buffer. Next, at step 138 the Element is copied from User Space into the Queue Slot. The Next Push Slot Number is correspondingly incremented, reflecting the addition of the Element into the Queue Slot. Having thus pushed an element, the Push Element 106 template then raises a signal to notify any client waiting on the same queue at 140. This Signal occurs on the Queue Shared Segment and notifies any clients waiting to access the same queue to Pop an Element.

Popping an Element involves the removal of an Element from the Queue Slot into User Space. Turning to 108, there is shown a flow chart for the Pop Element 108 Template. The process here begins by a determination on the status of the Queue, i.e., is the Queue Empty 142. In the event that the Queue is empty, the Pop Element 108 Template will wait at 144 until an Element is Pushed. That is, the Pop Element 108 Template will wait until the Queue is full and no longer has any Queue Slots open. In the event that the Queue is not empty (Queue is full) according to step 142, the Pop Element 108 Template will proceed to 146 and identify the Top of the Shared Segment based ring buffer. Next, the Element is copied from the Queue Slot at 148 into User Space. The Next Pop Slot Number is subsequently incremented to correspond to the change in status resulting in step 148. After incrementing the Next Slot Pop Number, the Pop Element 108 Template proceeds at 150, to raise a signal to notify any client that an Element was popped from the Queue. The Signal is raised on the Queue Shared Segment and notifies any clients waiting for an Element to be popped from the Queue that, in fact, an Element has been popped from the Queue.

The final basic operation of an IPC Queue Template as contemplated herein is the Peek Queue Slot 110 operation Template. In essence, the Peek Slot 110 Template allows a user to view the contents of the referenced Queue Slot without affecting its contents, if any. The Template makes a simple determination at step 152, whether or not there is a valid slot in the ring buffer. In the event that a valid slot exists, the Peek Queue Slot 110 Template directs to proceed to step 156, where the Queue Element is copied into User Space. In contrast, if the user has specified an invalid slot in the Queue, the Template directs the return of an Error at step 154.

Figure 2:
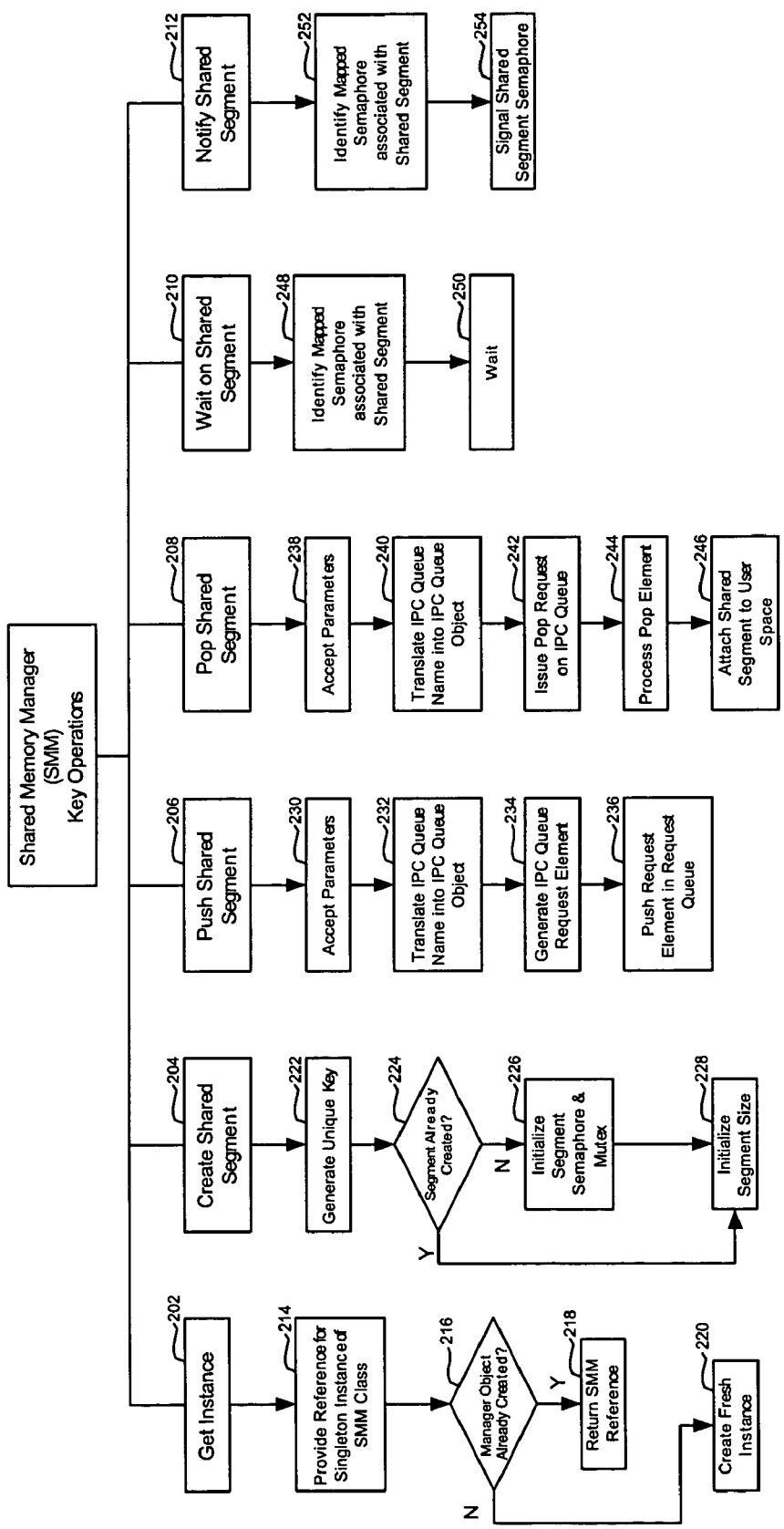
FIG. 2 is a flow chart illustrating the shared memory manager utilizing the inter-process communications templates contemplated by the present invention.

Having thus presented the several key operations inherent in the present embodiment of the subject invention, attention is directed now to FIG. 2, which shows the hierarchical structure of the Shared Memory Manager based on the above-explained IPC Queue templates of key operations. The Shared Memory Manager is capable of performing numerous operations in order to facilitate the communications between different processes and clients. Accordingly, one of ordinary skill will appreciate that the following key operations and accompanying flow charts do not limit the present Shared Memory Manager to only the six examples shown.

Turning first to the Get Instance 202 operation, the Shared Memory Manager acts in the following manner. The Shared Memory Manager will provide a caller with a reference for the singleton instance of the Shared Memory Manager Class at 214. Having given the caller the requested reference, the Shared Memory Manager must then determine at 216 if the Manager Object is already created. If the Manager Object has previously been created, the Get Instance 202 progresses to 218 where the Shared Memory Manager Reference is returned. If the Get Instance 202 operation determines that the Manager Object has not yet been created, the Get Instance 202 operation creates a fresh instance at 220. During the Shared Memory Manager Object creation an IPC Queue is created of Element Type STaSmmTable, which contains the following attributes: Segment Name, IPCKey, Num of Users, Semaphore Name, Semaphore Key.

The second operation that the Shared Memory Manager performs utilizing an IPC Queue Template is the Create Shared Segment 204 operation. In order for the users to create a Shared Segment, the operation 204 must first generate a unique key form the Segment Name at step 222. The Create Shared Segment 204 operation must then determine the status of the Segment in question at step 224. In the event that the Segment has already been created, the Segment Size is initialized at step 228. In the alternative, when the Segment has not yet been created, the operation 204 proceeds to step 226, where the Segment Semaphore and Mutex are initialized. Following the initialization of the Semaphore and Mutex for the Segment, the operation concludes at step 228, where the Segment Size is initialized.

The third operation exemplified in FIG. 2 is the Push Shared Segment 206 operation. This operation begins by accepting the parameters 230 containing a Shared Segment Reference and an IPC Queue Name. After acceptance in step 230, the operation 206 then translates the IPC Queue Name into an IPC Queue object at 232. The Shared Memory Manager maintains the cache of all the IPC Queues requested, enabling faster translation speeds. Following the translation, the Push Shared Segment 206 operation generates an IPC Queue Request Element at 234. This Request Element contains the Segment Size, Segment Name, Segment Key, and the Starting Point in the Shared Segment. The operation 206 then pushes the Request Element into the Request Queue at 236. This in turn raises a notification for any clients waiting to process a request on the same IPC Queue.

The fourth operation contemplated in FIG. 2 is the Pop Shared Segment 208 operation. This operation begins by accepting the parameters from the user at step 238. These parameters typically include the IPC Queue Name. Following acceptance, the operation 208 translates the IPC Queue Name into an IPC Queue Object at step 240. This is similar to the Push Shared Segment 206 operation discussed above, in that the Shared Memory Manager will maintain a cache of all IPC Queues requested allowing for faster translations. The operation 208 then proceeds to issue a Pop Request on the IPC Queue in step 242. However, in the event that there is no element in the Queue, the Pop Queue Request will wait until an Element is Pushed into the same Queue before continuing to step 244. In step 244, the Pop Element is processed. This entails converting the Shared Segment Name and Shared Segment Size into a Shared Segment Object. The Shared Segment maintains a memory map of all processes associated with it to enable faster generation of Shared Segment Objects during future Pop Shared Segment 208 operations. In order to provide easy access to the user, the Shared Memory Manager contemplated by the present invention attaches the Shared Segment into User Space at step 246.

The fifth operation enabled by the incorporation of the IPC Queue Templates into the contemplated Shared Memory Manager is the Wait on Shared Segment 210 operation. The operation begins with identifying a mapped Semaphore associated with the Shared Segment in step 248. Generally, this operation is utilized when a client is waiting for a server to process its request. After identifying the mapped Semaphore, the operation 210 progresses to wait in step 250 for the Shared Segment Semaphore.

The sixth operation so enabled by the use of the IPC Queue Templates is the operation of Notifying Shared Segment 212. The operation 212 first identifies the mapped Semaphore associated with the Shared Segment in step 252. Typically, this operation 212 is used when the server has received a request, and wishes to notify the client for its completion. After identifying the mapped Semaphore, the Shared Segment Semaphore is signaled at 254 for client notification.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially-the invention principles as described, will fall within the scope of the invention.

While in the preferred embodiment the present invention is implemented in software, as those skilled in the art can readily appreciate it may also be implemented in hardware or a combination of software and hardware. Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed is:

1. A system for peer-based inter-process communication comprising:
    a plurality of peer processes, each process including
    a bus system for selectively communicating data between first and second processes of the plurality thereof;
    means adapted for generating, via the first process, a shared memory message template in accordance with a format acceptable to each of a plurality of peer processes thereto;
    means adapted for setting an initialization process identification value to the first process;
    means adapted for communicating a generated shared memory message template to each of the plurality of peer processes; and
    a shared memory for selectively storing shared data in accordance with the generated shared memory message template such that shared data associated therewith is accessible by each of the plurality of processes;
    wherein each process includes notification means adapted for notifying at least one of the plurality of processes when a modification is made to content of the shared memory; and
    wherein each process includes a locking mechanism for selectively locking the shared memory from access by at least one other process.

2. The system for peer-based inter-process communication of claim 1, wherein the shared memory message template further comprises a header component.

3. The system for peer-based inter-process communication of claim 2, wherein the header component further comprises information representative of a maximum number of elements in the shared memory.

4. The system for peer-based inter-process communication of claim 2, wherein the header component further comprises information representative of a next element used when adding an element to the shared memory.

5. The system for peer-based inter-process communication of claim 2, wherein the header component further comprises information representative of a next element used when retrieving an element from the shared memory.

6. The system for peer-based inter-process communication of claim 2, wherein the header component further comprises information representative of a number of used elements in the shared memory.

7. The system for peer-based inter-process communications of claim 1 further comprising means adapted for determining a number of the plurality of processes accessing the shared memory.

8. The system for peer-based inter-process communications of claim 1 further comprising means adapted for resetting the shared memory to initialize the memory, wherein the stored shared data is deleted.

9. A method for peer-based inter-process communication performed in a system comprising a plurality of peer processes, wherein the method comprises the steps of:
    selectively communicating data between a first and a second process of the plurality of peer processes;
    generating, via the first process, a shared memory message template in accordance with a format acceptable to each of a plurality of peer processes thereto;
    setting an initialization process identification value to the first process;
    communicating a generated shared memory message template to each of the plurality of peer processes;
    selectively storing shared data in accordance with the generated shared memory message template such that shared data associated therewith is in a shared memory accessible by each of the plurality of processes;
    notifying at least one of the plurality of processes when a modification is made to content of the shared memory; and
    selectively locking the shared memory from access by at least one other process.

10. The method for peer-based inter-process communication of claim 9, wherein the shared memory message template further comprises a header component.

11. The method for peer-based inter-process communication of claim 10, wherein the header component further comprises information representative of a maximum number of elements in the shared memory.

12. The method for peer-based inter-process communication of claim 10, wherein the header component further comprises information representative of a next element used when adding an element to the shared memory.

13. The method for peer-based inter-process communication of claim 10, wherein the header component further comprises information representative of a next element used when retrieving an element from the shared memory.

14. The method for peer-based inter-process communication of claim 10, wherein the header component further comprises information representative of a number of used elements in the shared memory.

15. The method for peer-based inter-process communications of claim 9 further comprising the step of determining a number of the plurality of processes accessing the shared memory.

16. The method for peer-based inter-process communications of claim 9 further comprising the step of resetting the shared memory to initialize the memory, wherein the stored shared data is deleted.

17. A computer implemented method for peer-based inter-process communication performed in a system comprising a plurality of peer processes, wherein the method comprises the steps of:

selectively communicating data between a first and a second process of the plurality of peer processes;

generating, via the first process, a shared memory message template in accordance with a format acceptable to each of a plurality of peer processes thereto;

setting an initialization process identification value to the first process;

communicating a generated shared memory message template to each of the plurality of peer processes;

selectively storing shared data in accordance with the generated shared memory message template such that shared data associated therewith is in a shared memory accessible by each of the plurality of processes;

notifying at least one of the plurality of processes when a modification is made to content of the shared memory; and selectively locking the shared memory from access by at least one other process.

18. The computer implemented method for peer-based inter-process communication of claim 17, wherein the shared memory message template further comprises a header component.

19. The computer implemented method for peer-based inter-process communication of claim 18, wherein the header component further comprises information representative of a maximum number of elements in the shared memory.

20. The computer implemented method for peer-based inter-process communication of claim 18, wherein the header component further comprises means adapted for designating a next element used when adding an element to the shared memory.

21. The computer implemented method for peer-based inter-process communication of claim 18, wherein the header component further comprises means adapted for designating a next element used when retrieving an element from the shared memory.

22. The computer implemented method for peer-based inter-process communication of claim 18, wherein the header component further comprises means adapted for indicating a number of used elements in the shared memory.

23. The computer implemented method for peer-based inter-process communications of claim 17 further comprising the step of determining a number of the plurality of processes accessing the shared memory.

24. The computer implemented method for peer-based inter-process communications of claim 17 further comprising the step of resetting the shared memory to initialize the memory, wherein the stored shared data is deleted.

* * * * *